Oct. 6, 1970 G. P. TOROK 3,532,815

VISUAL TELEPHONE SUBSCRIBER ALIGNMENT APPARATUS

Filed April 4, 1967 4 Sheets-Sheet 1

INVENTOR
G. P. TOROK
BY C. E. Hirsch Jr.
ATTORNEY

VISUAL TELEPHONE SUBSCRIBER ALIGNMENT APPARATUS

Filed April 4, 1967

4 Sheets-Sheet 3

VISUAL TELEPHONE SUBSCRIBER ALIGNMENT APPARATUS

Filed April 4, 1967 4 Sheets-Sheet 4

United States Patent Office 3,532,815

Patented Oct. 6, 1970

3,532,815

VISUAL TELEPHONE SUBSCRIBER ALIGNMENT APPARATUS

Gabor P. Torok, Mount View, Calif., assignor to Bell Telephone Laboratories, Incorporated, Murray Hill, N.J., a corporation of New York Filed Apr. 4, 1967, Ser. No. 628,426
Int. Cl. H04n 5/64
U.S. Cl. 178—7.85 8 Claims

ABSTRACT OF THE DISCLOSURE

Apparatus is often required for visually indicating to a person using a visual telephone set, or the like, that he is properly positioned within the field of a camera usually associated with such a set. Parts of a distinctive pattern which become visible to a person when he is improperly positioned may be used to warn him of the fact. Preferably, the warning indication is embodied in an aesthetically acceptable structure associated with the viewing system.

BACKGROUND OF THE INVENTION

Field of the invention

This invention relates to alignment apparatus and, more particularly, to apparatus for use with a visual telephone set for providing a subscriber with a visual indication that he is properly aligned with the station set camera.

In using a visual telephone set, a subscriber must align himself properly with respect to the station set camera. Otherwise, a remote subscriber is likely to view a scene that shows only a portion of that which is desired. For example he may view only a part of the local subscriber's facial features.

Description of the prior art

Attempts have been made at solving this problem, namely, that of indicating to a subscriber that he is properly within the field of view of the camera, and several alignment devices have been proposed. For example, a "light tube" system and a system utilizing mirrors were disclosed in U.S. Pat. 2,909,600, issued to F. K. Becker on Oct. 20. 1959. These devices, although acceptable functionally, are unsatisfactory in use because they tend to distract the subscriber from the scene he is viewing. Moreover, these systems are unsatisfactory in practice because they require much valuable cabinet space. Another attempt at solving this problem involves the use of a cone of light projected to circumscribe the eyes of the subscriber when he is properly aligned; hopefully, he does not see the light. When aligned improperly, the light becomes visible to him. Again, this device is functionally satisfactory. However, it is distracting to a subscriber to have a light shining at or about his eyes. Additionally, the apparatus necessary to project the cone of light requires considerable space within the cabinet. Still another suggested solution to the problem uses a switching circuit that permits the subscriber's image to be reproduced on the display device of the local station set. The subscriber can align himself from this image. As with other proposals, this system is functionally satisfactory but contains other drawbacks. For example, it employs additional complex electrical equipment. Since the scene being viewed must be frequently interrupted for alignment, the subscriber is frequently distracted from the scene he is viewing.

SUMMARY OF THE INVENTION

It is desirable that subscriber alignment be achieved by use of an alignment arrangement that minimizes distraction of the subscriber from the scene he is viewing. Further, it is desirable that the arrangement require little additional equipment and occupy little additional space.

Therefore, it is an object of this invention to indicate with maximum simplicity and minimum distraction, to one having his image reproduced by a camera, or other image sensing device, that he is properly aligned within the field of the apparatus sensing his image.

Objects of this invention are attained by use of a unique arrangement which in large measure resembles a "shadow box" which enables a subscriber using a visual telephone set, or other image sensing device, to position himself properly within the field of an image sensor. Typically, the arrangement is disposed about a display device associated with an image sensing device, in such a manner to circumscribe and protrude from the face of the display device. The interior face of the structure is equipped with a distinctive visual pattern.

One embodiment of the invention employs two frame-like members separated by a band to form a unitary structure having a shallow U-shaped cross section. The interior portion of the structure is distinctively patterned. The structure may be mounted to circumscribe the face of a viewing screen. For example, it can be fitted into a shallow recess between the front face of the cabinet of a visual telephone station set and the face of the viewing screen.

In a typical visual telephone arrangement, the camera and image screens are juxtaposed such that a person positioned at a specified viewing, or focusing, distance in front of the camera-screen arrangement, and having his eyes at the proper level, can see the screen, and is in camera range. By means of the arrangement of the present invention, a viewer is properly aligned if none of the interior surface of the band is visible to him. He is not properly aligned if portions of the interior surface of the band are visible. Thus, the arrangement of the frame-like structure and distinctive pattern presents a correctional pattern defining visually the boundary of the field of the camera. For example, a person misaligned to the right sees portions of the left side of the band; a person misaligned high and to the left views portions of the lower and right sides of the band.

In addition to the on-center or off-center warning, it is desirable for the subscriber to know how far off center he is. A quantitative indication is achieved in accordance with this invention by using interior surface patterns characterized by distinctive designs, such as variously colored stripes, or the like. The number, or color, of the stripes visible indicates the degree of misalignment.

The present invention additionally is effective in visually indicating to a person the range of acceptable depth within the field of the camera. For this use, both the interior and exterior surfaces of the frame-like structure are employed as guides. Both surfaces are angled to form a structure having a wedge-like shaped cross section, and the structure is arranged such that a person aligned properly and at an acceptable distance from the image sensor sees only the front edge of the structure; a subscriber too too close sees portions of the interior surface; and a person too distant sees portions of the exterior surface. When aligned properly in this region, a person sees equal portions of the respective surfaces. He is thus visually warned both of misalignment, as when portion of the interior, exterior, or both of the surfaces are visible, and of the degree of misalignment.

Visual telephone station sets ordinarily are used by different individuals at different times. Therefore, it becomes necessary to vary the viewing angle of the station set camera. For example, a short woman will necessarily be positioned at a lower elevation than a tall man. The camera angle can be adjusted to accommodate these differences either by moving the entire instrument, or by holding the instrument in a fixed position and adjusting the camera function. For a fixed station set, it is necessary to modify the viewer alignment apparatus to coincide with the field of view of the camera. Accordingly, in the present invention, vertical viewer alignment is varied by adjusting the upper and lower elements of the alignment apparatus to provide a new angle of view. The proper position of vertical alignment is visually marked to a person by imaginary axes projecting from the surfaces of the alignment apparatus. Therefore, by varying these axes the position of proper vertical alignment may be adjusted to any desired point. Preferably, the elements of the apparatus are varied in synchronism with each other and with the camera. For example, the upper and lower elements of the apparatus may be pivotally attached to the front surface of the cabinet to allow movement in conjunction with the variable camera angle. Alternatively, the surfaces of the upper and lower elements of the apparatus may be angled in such a manner that imaginary axes projecting from the surfaces visually mark the limits of the vertical field of the camera.

To confine a viewer to a proper position within the field of the camera, the background area visible to the person is adjusted to provide a new angle of view by sliding members, or the like, positioned parallel to and contiguous with the background surface. The surface of the sliding members and the interior surfaces of the alignment apparatus are distinguished similarly, e.g., by the same color. The background area is distinctively colored. Thus, a person properly positioned within the field of the camera will view only the background area, and none of the interior surfaces or sliding member surfaces are visible. The proper alignment position is changed to coincide with the variation of viewing angle of the camera by adjusting the sliding members. For example, to reposition the area of proper alignment to a new position that is above a given position, the slide member associated with the lower interior surface is moved to a lower position causing a larger amount of the background area to be visible and the upper slide member is moved to decrease that area of the background visible. Thus, a person is in proper alignment when he is in such a position that only background color, and none of the interior surfaces or slide member surfaces, is within his field of view.

Several embodiments of the invention are described herein as structures separable from or additions to a visual telephone set. However, the principles of the present invention may be turned to account in numerous ways. For example, apparatus in accordance with the invention may be molded into a visual telephone set cabinet. As another example, the edges of a protective shield that covers the viewing screen, or a circumscribing decorative cabinet offset, may be etched or colored to form the warning pattern.

The invention will be fully apprehended from the following detailed description of illustrative embodiments thereof read in connection with the appended drawings.

DESCRIPTION OF THE EMBODIMENTS

Figure 1:
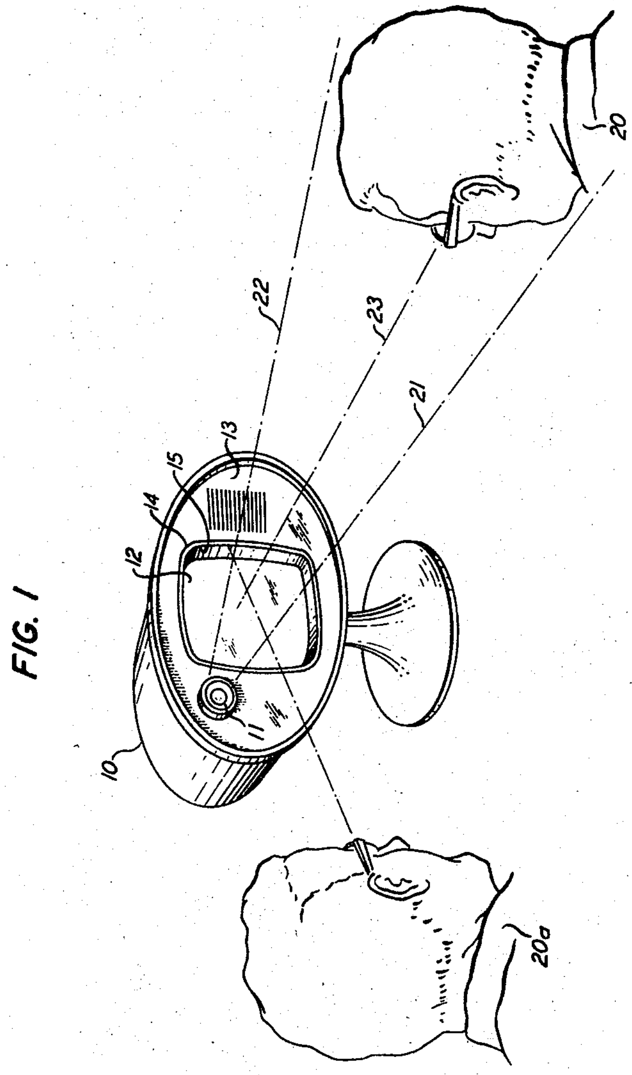
FIG. 1 is a schematic presentation of a subscriber utilizing a visual telephone set equipped with alignment apparatus in accordance with one embodiment of the present invention.

FIG. 1 illustrates a subscriber 20 using a visual telephone set 10 that incorporates alignment apparatus 14 constructed in accordance with the present invention. A camera 11, for example, one having a vidicon pick-up element, and a viewing device 12, for example, a cathode ray tube, are mounted in visual telephone set 10. Alignment apparatus 14 of the present invention is positioned, in this embodiment, in a shallow recess between the front surface 13 of the cabinet of set 10 and the front surface of viewing device 12. Subscriber 20, when properly aligned within the field of camera 11, as indicated by axes 21 and 22, and with his eyes at the proper level, as indicated by axis 23, views alignment apparatus 14 head-on, and none of its interior surface 15 is visible to him. However, if he is misaligned, for example, above and to the left of the field, as indicated by subscriber **20*a*, a warning of misalignment is indicated by the portions of interior surface 15 that are visible. In this instance, the right and lower portions of interior surface 15 are visible; they convey a warning to the subscriber to realign himself. That is to say, members 16 and 18 (FIGS. 2 and 3) of apparatus 14 are relatively proportioned to exhibit a first predetermined pattern along visual axes outside the boundary of the field of camera 11 (FIG. 1) and a second predetermined pattern along visual axes within the boundary of the field. Alignment apparatus 14 positioned about the periphery of viewing device 12 presents no appreciable distraction to subscriber 20**; he views the scene directly, and the alignment pattern only peripherally. Due to this unique arrangement, proper alignment is maintained with little or no distraction, i.e., without conscious effort.

Figure 2:
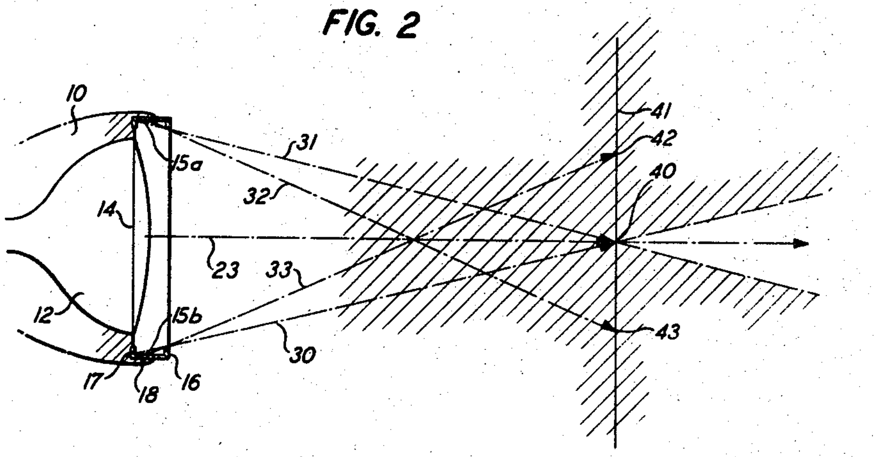
FIG. 2 is a schematic diagram illustrating the manner in which an indication of vertical alignment is provided in the present invention.

FIG. 2 is a side sectional view of a visual telephone set 10 having alignment apparatus 14, in accordance with the invention, mounted about the face of picture tube 12. It comprises, in this embodiment, two frame-like members 16 and 17 separated by a band 18. The interior surface 15 of band 18 is distinctively patterned to be distinguishable from frame-like members 16 and 17. A person positioned in plane 41, which is the proper viewing or focusing distance from the front of set 10, in this instance 36 to 40 inches, at point 40 and having his eye level on axis 23, is in proper vertical alignment. When so positioned, the person's view of the face of apparatus 10, as indicated by axes 30 and 31, is such that frame-like member 16 acts as a flange and prevents any of interior surface 15 of band 18 from being visible to him. If misaligned, for example, vertically, by the eye level being above axis 23 at point 42, the person's view of the set, as partially defined by axis 33, renders visible portions of interior surface **15*b*. A person positioned below axis 23, for example, to view tube 12 from point 43, has a view partially defined by axis 32, and portions of interior surface 15*a* are visible to him. The amount of interior surface 15 visible indicates the degree of misalignment to the subscriber. The degree of misalignment can be readily indicated by dividing interior surface 15 into differently designed sectors, for example, by differently colored stripes. Thus, the greater number of stripes visible, the greater the misalignment. A person positioned too close to set 10, for example in the region between plane 41 and set 10, will be able to view more than one side of interior surface 15. If centered in this area the viewer sees equal portions of interior sufarces 15**.

Figure 3:
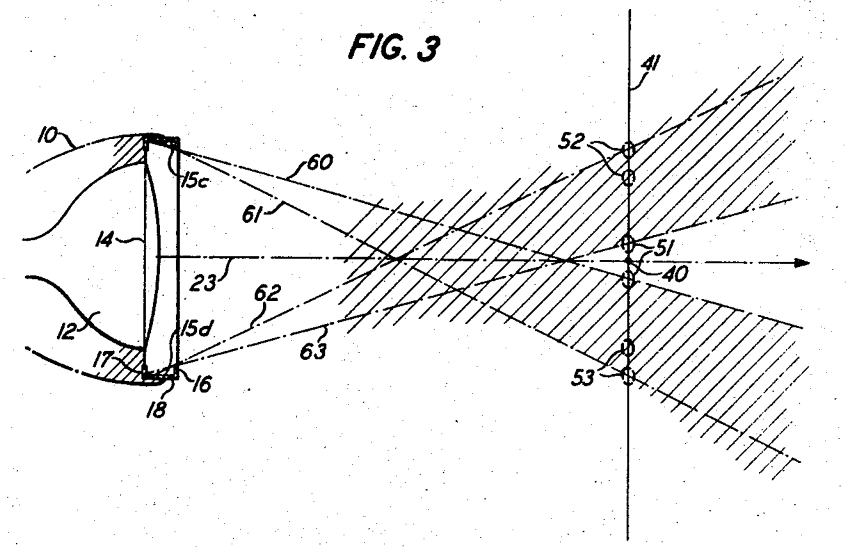
FIG. 3 is a schematic diagram illustrating the manner in which an indication of lateral alignment is attained in the present invention.

FIG. 3 is a top sectional view of visual telephone set 10 having alignment apparatus 14 mounted around cathode ray tube 12. A viewer having his eyes positioned at 51 symmetrically about axis 23, and along plane 41 is in proper lateral alignment within the field of the camera. The person's view of the station set, as indicated by axes 60 and 63, is such that none of interior surface 15 of band 18 is visible to him. If misaligned in a lateral direction, for example off center to the right of axis 23, as indicated by eye positions 52, the person's view from the right eye is along axis 62, and portions of interior surface **15*d* are visible, i.e., the left side of interior surface 15. If off-center to the left, as indicated by eye positions 53, the person's view from the left eye is along axis 61, and portions of the right side of interior surface 15, as indicated by interior surface 15*c*, are visible. Thus, when portions of interior surface 15** are within the subscriber's view, he is warned to align himself in a lateral direction.

Combining the vertical alignment function as described in FIG. 2 and the lateral alignment function as described in FIG. 3, it can be readily seen that the subscriber perceives an indication of misalignment in a vertical direction, a lateral direction, or both.

Physical dimensions of alignment apparatus 14 of FIGS. 2 and 3, that is, the width of band 18 and the dimensions of framelike members 16 and 17, are dependent primarily on the distance the subscriber is to be positioned in front of the set. In a typical example from practice, with a viewing screen approximately 4⅜ inches by 5½ inches, a frame 4⅜ inches by 5½ inches, and a band width of 0.8 inch, was found to be satisfactory for a viewing distance of 40 inches.

Figure 4:
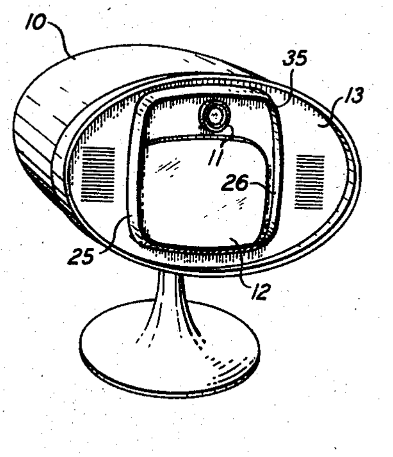
FIG. 4 is a schematic presentation of a visual telephone set incorporating another form of alignment apparatus in accordance with the present invention.

FIG. 4 shows another embodiment of the invention arranged to give a person, in addition to a visual centering indication, an indication of an acceptable operating distance from set 10. It is in the form of a decided (truncated) wedge-like frame 35 mounted to viewing screen 12 and the image face of camera 11 and to protrude from front panel 13 of visual telephone set 10. Thus, whereas previously described apparatus was generally contained in a recess in panel 13, apparatus 35 is positioned as a protrusion from the front panel. Both interior surface 26 and exterior surface 25 are used to provide the indication.

Figure 5:
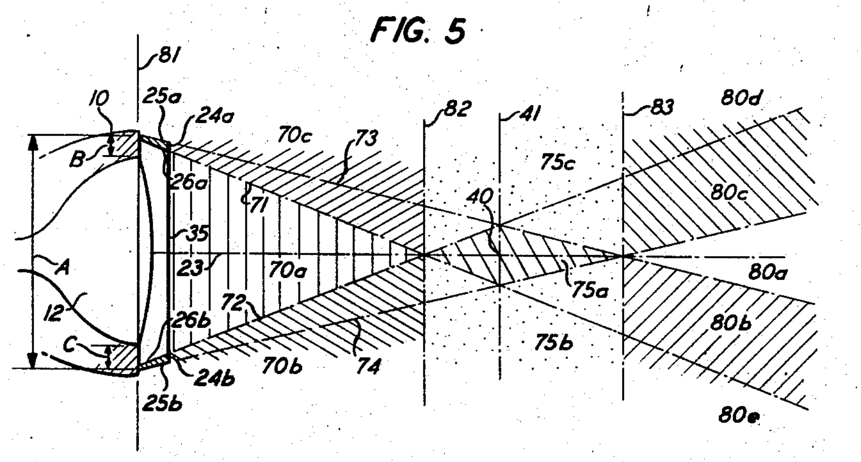
FIG. 5 is a schematic illustrating the manner in which an indication of lateral alignment is produced in the apparatus of FIG. 4.

FIG. 5 is a top sectional view of wedge-shaped apparatus 35 mounted about viewing screen 12 in the fashion illustrated in FIG. 4. Regions in which a person is properly positioned are marked by axes 71, 72, 73 and 74 projecting from inner surfaces **26*a*, 26*b* and outer surfaces 25*a*, 25*b*. Planes 81 and 82 define a region which is generally too close to viewing screen 12 to permit proper focus to be maintained by the associated camera 11. Plane 83 defines the outside limit of focus for the camera; the region beyond plane 83 is thus too distant for satisfactory use of the visual telephone instrument. Planes 82 and 83 define the preferred region of operation both to permit a satisfactory view of screen 12** and to satisfy the depth of field requirements of the camera.

As before, vertical and lateral alignment is necessary. Region **75*a* defines a preferred viewing region that is both in range and in alignment. Regions 75*b* and 75*c*, though in range, are out of alignment. In accordance with the invention, a subscriber positioned within region 75*a*, for example in plane 41, is at an optimum distance from set 10 and is properly centered within the field of the camera. The subscriber observes that he is properly centered since he sees only the front edges 24*a* and 24*b* of apparatus 35. He sees neither the interior nor the exterior surfaces of the wedge. However, if the subscriber is positioned outside of the acceptable area, e.g., in regions 75*b* or 75*c*, he perceives a visual warning. If he is in region 75*b*, he observes portions of the interior surface 26*a* and portions of the exterior surface 25*b*. The ratio of the portions visible to him indicates the degree of lateral displacement. If he is in region 75*c*, he observes portions of the interior surface 26*b* and the exterior surface 25*a*. Again, the ratio denotes the degree of misalignment. A viewer located in region 70*a* views portions of both interior surfaces 26*a* and 26*b*. If equal portions are observed, he is centered properly but is nevertheless too close to screen 12**.

If he is positioned beyond plane 83, he observes portions of the exterior surfaces **25*a* and 25*b*. As before, if equal portions are observed, alignment may be proper but he is beyond the appropriate depth of field acceptable to the camera. Again, if misaligned, for example, in area 80*d*, the person would see portions of exterior surface 25*a* and interior surface 26*b*. In the more likely case, that of being in area 80*c*, the person would see portions of exterior surface 25*a*, and none of interior surface 26*b***.

Thus, a person is visually warned of misalignment, and the degree of misalignment, by the surfaces visible to him. The surfaces visible are, in turn, dependent upon position. The various regions are defined (still referring to FIG. 5) by the axes 71, 72, 73, and 74, projected from the respective surfaces of the wedge-like members and are determined by the angles between plane 81 and interior surfaces **26*a* and 26*b*, and between plane 81 and surfaces 25*a* and 25*b*. Therefore, knowing the optimum viewing distance or focusing distance from the front of set 10, i.e., the distance between plane 81 and plane 41, the distance (A) between the sides of apparatus 35, and the range of acceptable position, i.e., the distance between planes 82 and 83, the necessary angles can be readily determined. The distances (B) and (C) between viewing surface 12 and the respective sides of the alignment apparatus are not critical and can vary over a large range. Also, the viewing device 12** need not be recessed as shown, it can protrude further into the region between the sides of the alignment apparatus so long as the sides of the alignment apparatus are not obstructed from view.

Figure 6:
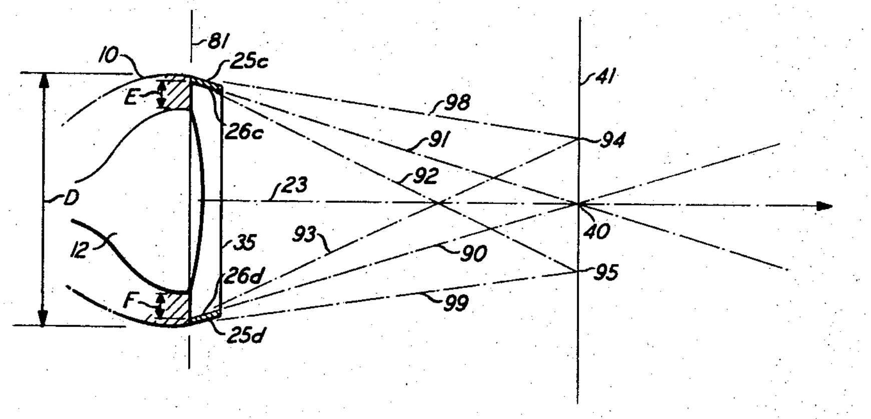
FIG. 6 is a simplified schematic diagram illustrating the manner in which an indication of vertical alignment is attained in the apparatus of FIG. 4.

FIG. 6 is a sectional view illustrating the factors involved in vertical alignment. Camera 11 is omitted for clarity. The surfaces **25*c*, 26*c*, 25*d*, and 26*d*, of apparatus 25 are angled and arranged in such a manner that axes projected from the respective surfaces, for example, axes 90 and 91 projected from surfaces 26*d* and 26*c*, respectively, indicate a focus at point 40. Axes projected from surfaces 25*c* and 25*d* are not shown. Thus, these surfaces of apparatus 35 exhibit a cross-section in the shape of a truncated wedge. The angles between plane 81 and surfaces 26*c*, 26*d*, 25*c*, and 25*d*, respectively, are determined by the distance between plane 81 and plane 41, and the distance (D) between the sides of apparatus 35. The distances (E) and (F) between the cathode ray tube 12 and the sides of apparatus 35** are not critical.

This apparatus visually indicates proper vertical alignment to a viewer. For example, a person positioned with his eye level approximately at point 40 will view only the front edges of apparatus 35; none of the interior or exterior surfaces will be within his view. When a person is misaligned, for example, too high, at point 94, his view of the display is along axes 93 and 98, and portions of interior surface **26*d* and exterior surface 25*c* of the alignment arrangement are visible to him. Likewise, if positioned too low, for example, at point 95, his view is along axes 92 and 99 and interior surface 26*c* and exterior surface 25*d* are visible. When he is in a position too close to set 10, e.g., between planes 81 and 41, he is warned by portions of both interior surfaces 26***c* and 26*d*. When too distant from set 10, portions of both exterior surfaces 25*c* and 25*d* are visible. Thus, when portions of the interior, exterior, or both of the surfaces are visible, the person is warned to readjust his position back to point 40.

Figure 7:
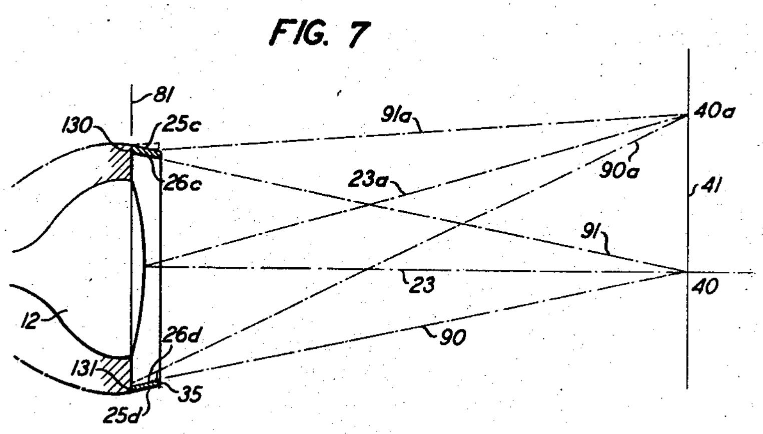
FIG.7 is a schematic illustrating the manner in which the position of proper vertical alignment can be varied in accordance with the present invention.

Variation in camera angle is necessary to accommodate people of different heights. It is therefore desirable to vary the indication of vertical alignment to coincide with a variation in camera angle. FIG. 7 shows alignment apparatus used to vary the indication of proper vertical alignment. It is substantially the same as that of FIG. 6 except that the upper and lower elements of apparatus 35 are pivotally mounted to the front surface of the cabinet of set 10, e.g., in plane 81 at points 130 and 131, respectively. Pivotal mounting of the elements allows the indication of proper vertical alignment to be varied. Two positions of proper vertical alignment are shown in FIG. 7, one at point 40, as described in FIG. 6 above, and one at point 40*a*. The approximate region of proper alignment at point 40 is visually indicated to a person. Axes 90 and 91 projected from the respective surfaces of apparatus 35 show this range. Therefore, to change the indication of proper vertical alignment, for example, to point 40*a*, the projecting elements of the apparatus are tilted to a different position, as indicated by the dotted lines. The new indication of alignment at point 40*a* is illustrated by axes 90*a* and 91*a*. The variation in the angles between plane 81 and the surfaces of apparatus 35 are approximately equal for the upper and lower elements.

Figure 8:
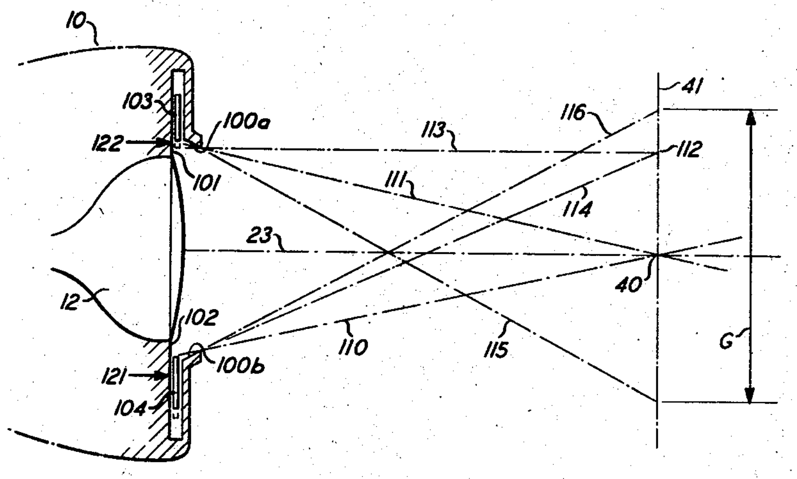
FIG. 8 is a schematic diagram of an embodiment of the invention illustrating the manner in which the position of proper vertical alignment can be varied.

FIG. 8 is a side sectional view of a set 10 incorporating another embodiment of apparatus used to vary the indication of proper vertical alignment. The apparatus is arranged in such a manner that surfaces 100*a* and 100*b* are angled such that axes 115 and 116 projected from the respective surfaces denote the maximum camera field, as indicated by distance (G) to an observer. Sliding-members 103 and 104 are coupled to each other, e.g., mechanically, and to the camera and move in synchronism. Members 103 and 104 are used to restrict the background areas 101 and 102 visible to the observer. The surfaces of the sliding members 103 and 104, and surfaces 100*a* and 100*b* are similarly colored while the background areas, i.e., 101 and 102, is distinctively colored. To position a person approximately at a given point, for example at point 40, the sliding members are adjusted to allow a given portion of the background area to be visible to an observer. Taking point 40 as the nominal vertical alignment position, the observer's view of the screen of tube 12 is along axes 110 and 111, and equal parts of background areas 101 and 102 are visible to him. None of the surfaces of sliding-members 103 and 104, and surfaces 100*a* and 100*b* are within his view. To reposition the approximate area of proper vertical alignment to accommodate a taller person, for example at point 112, the slide members are moved. Member 103 is lowered to a point indicated by the dashed lines, thereby decreasing the background area 101 visible, and member 103 is lowered to a point as indicated by the dashed lines, increasing the visibility of area 102 by an amount equal to the decrease in area 101. Thus, an individual positioned approximately at point 112 perceives an indication of proper alignment when portions of the background areas 101 and 102 only are visible to him, as indicated by axes 113 and 114. If portions of either slide members 103 and 104, or surfaces 100*a* and 100*b* are visible, the observer is warned to adjust his position accordingly.

Figure 9:
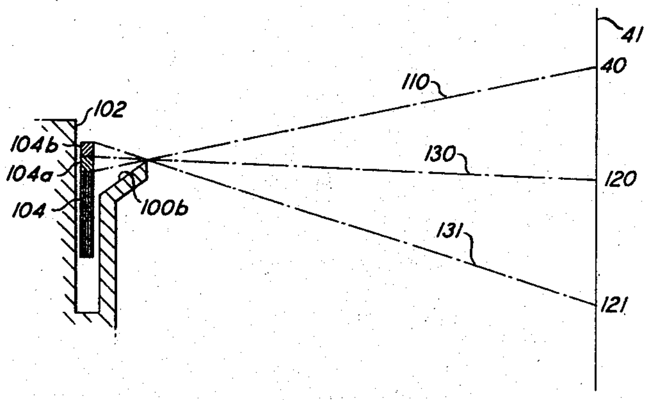
FIG. 9 is an enlarged view of a section of the apparatus of FIG. 8.

To further illustrate the operation of the sliding-members of FIG. 8, one section of that apparatus is shown in FIG. 9. As described above, the nominal observer position is at point 40 and the observer's view of the members is along axis 110. When positioned approximately at point 40, none of surface 100*b* and the surface of slide member 104 is visible. He will view only background area 102. To readjust the approximate area of proper vertical alignment, for example to point 120, sliding-member 104 is raised to a new position, as indicated by 104*a*. An observer positioned at point 120 will view along axis 130, and again only background area 102 is visible. Another adjustment of the vertical position to accommodate an observer at point 121 and having his field of view partially along axis 131, is indicated by repositioned slide member 104*b*.

Figure 10:
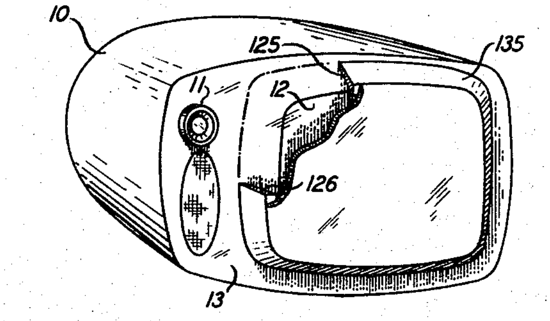
FIG. 10 is a pictorial illustration of a visual telephone set incorporating the present invention in yet another form.

Another embodiment of the present invention is pictorially shown in FIG. 10. Alignment apparatus 135 is incorporated in the protective shield that usually covers the viewing device 12. The sides of the shield are similar in cross section, i.e., section 126 and section 125, to the apparatus described in FIGS. 5 and 6, respectively. The formed edges act, therefore, as visual guides in the fashion of the separate members previously described.

The above-described arrangements are, of course, merely illustrative of the application of the principles of the invention. Numerous other arrangements may be devised by those skilled in the art without departing from the spirit and scope of the invention. For example, the edges of a protective shield bonded directly to a cathode ray tube may be formed to achieve the visual indication function of the present invention. Moreover, the outer surface of the cabinet may be arranged to perform the indicating function. For example, the edges of the cabinet may be formed with the requisite angles and may be patterned to act as the guide members of the invention. Evidently, a considerable degree of visual indication is afforded by the exterior surface of member 135, i.e., that surface corresponding to 25 in FIGS. 5 and 6. Consequently, a decorative offset in the surface of cabinet 10 surrounding display device 12, or in other means for supporting the camera or display device or both, yields an appearance similar to that of the apparatus illustrated in FIG. 10. It performs a similar alignment function.

Many other arrangements may be employed, for example, the apparatus may be positioned to surround the aperture through which the camera lens system senses the image.

What is claimed is:

1. Alignment apparatus for enabling a person using a visual telephone station set including a camera and a viewing device having a viewing surface to position himself within the field of said camera comprising, a first member, a second member, and a third member having interior and exterior surfaces joining said first and second members to form a unitary frame-like structure having a U-shaped cross section, said U-shaped frame-like structure being mounted about the perimeter of and protruding from the viewing surface of said viewing device and said members being selectively proportioned to define visually the boundary of the field of said camera so that none of the interior surface of said third member is projected along visual axes indicating correct positional alignment within said field and portions of the interior surface of said third member are projected along visual axes indicating incorrect positional alignment within said field.

2. Alignment apparatus as defined in claim 1 wherein said first and said second members are similarly colored and said surfaces of said third member are distinctively colored.

3. Alignment apparatus as defined in claim 1 wherein the interior surface of said third member is divided into a plurality of differently colored stripes for indicating quantitative position within said field.

4. Alignment aparatus for enabling a person utilizing a visual telephone station set including a camera and a display device to position himself correctly within the boundary of the field of said camera, which field is selectively positioned within predetermined maximum boundaries comprising, a frame-like structure having a plurality of surfaces, said frame-like structure being mounted about the perimeter of said display device so that said surfaces protrude from the viewing surface of said display device at a predetermined angle for projecting a pattern along visual axes extending from said surfaces of said frame-like structure denoting the maximum boundary within which said camera field can be positioned, distinctive pattern means for denoting the boundary of said camera field within said maximum boundary, means for selectively movably spacing said distinctive pattern means with respect to said surfaces of said frame-like structure to project a correct positional pattern along visual axes indicating correct positional alignment within the bounds of said field, and means for selectively moving said distinctive pattern means so that said correct positional pattern is varied and projected along visual axes in accordance with variations in the position of the boundary of said camera field within said maximum boundary.

5. Alignment apparatus as defined in claim 4 wherein said distinctive pattern means includes sliding members, said sliding members being spaced with respect to the surfaces of said frame-like structure to provide a controllable correctional pattern and said moving means includes means for synchronously moving said sliding members to control the projection of the correctional pattern such that the correct position of alignment is selectively changed.

6. Alignment apparatus for a display system including a camera and a display device for indicating to a person that he is correctly positioned within the boundary of the field of said camera comprising, a member having at least first and second surfaces mounted about the perimeter of said display device, said first and second surfaces being in a preestablished spatial relationship to form a frame-like structure having a truncated wedge-like cross section, and distinctive pattern means disposed on at least one of said surfaces for exhibiting a correct positional pattern, said first and second surfaces being selectively proportioned and angularly positioned relative to the viewing surface of said display device so that none of said distinctive pattern means is exhibited along visual axes within the boundary of said camera field and portions of said distinctive pattern means are exhibited along visual axes outside the boundary of said field.

7. Alignment apparatus as defined in claim 6 further including means for selectively moving portions of said frame-like structure, said moving means including pivotal means and means for synchronously varying the angular position of said surfaces of said frame-like structure with respect to the viewing surface of said display device so that the projection of said correct positional pattern selectively alters the position of correct alignment within said field.

8. Apparatus as defined in claim 6 wherein said distinctive pattern means includes progressive variations in its pattern for indicating quantitative position within the boundary of said field.

References Cited

UNITED STATES PATENTS

| | | | |
|---|---|---|---|
| D. 200,495 | 3/1965 | Dreyfuss ---------- | D26—14 X |
| 2,895,005 | 7/1959 | Kock et al. ------ | 178—7.85 X |
| 3,116,365 | 12/1963 | Prescott --------- | 178—7.85 X |

ROBERT L. GRIFFIN, Primary Examiner

R. K. ECKERT, Jr., Assistant Examiner

U.S. Cl. X.R.

178—7.8, 7.9